(12) United States Patent
Ables

(10) Patent No.: US 9,971,786 B2
(45) Date of Patent: May 15, 2018

(54) SYNCHRONIZATION OF COLLABORATIVE DOCUMENTS WITH AN ONLINE DOCUMENT MANAGEMENT SYSTEM

(71) Applicant: Ricoh Americas Holdings, West Caldwell, NJ (US)

(72) Inventor: Christopher Ables, Coral Springs, FL (US)

(73) Assignee: Ricoh Company, Ltd., Tokyo (JP)

( * ) Notice: Subject to any disclaimer, the term of this patent is extended or adjusted under 35 U.S.C. 154(b) by 710 days.

(21) Appl. No.: 14/548,619

(22) Filed: Nov. 20, 2014

(65) Prior Publication Data

US 2016/0147787 A1    May 26, 2016

(51) Int. Cl.
*G06F 17/30*    (2006.01)
(52) U.S. Cl.
CPC ............... *G06F 17/30174* (2013.01)
(58) Field of Classification Search
CPC .................................. G06F 17/30174
See application file for complete search history.

(56) References Cited

U.S. PATENT DOCUMENTS

| 8,515,902 | B2 | 8/2013 | Savage | |
|---|---|---|---|---|
| 2007/0185879 | A1* | 8/2007 | Roublev | G06F 17/30073 |
| 2008/0256174 | A1* | 10/2008 | Toivonen | G06F 17/30174 |
| | | | | 709/203 |
| 2010/0138387 | A1* | 6/2010 | Simelius | G06F 17/30174 |
| | | | | 707/624 |
| 2015/0326582 | A1* | 11/2015 | Al-Khowaiter | H04L 67/1097 |
| | | | | 726/4 |

* cited by examiner

*Primary Examiner* — Jay A Morrison
(74) *Attorney, Agent, or Firm* — Duft Bornsen & Fettig LLP

(57) ABSTRACT

Embodiments describe document synchronization between a client and an online document management system. In one embodiment, a computing device identifies a mapping between a local folder and a remote folder, identifies a local file in the local folder, and determines if a remote copy of the local file exists in the remote folder. When the remote copy does not exist, the computing device either uploads the local file to the remote folder or moves the local file to an archive folder on the computing depending on whether the local file was modified after a previous synchronization. When the remote copy does exist, the computing device either uploads the local file to the remote folder or skips the upload depending on whether the remote copy was modified after a previous synchronization, the local file was modified after the remote copy, and the local file and the remote copy have different file sizes.

18 Claims, 6 Drawing Sheets

SYNCHRONIZATION OF COLLABORATIVE DOCUMENTS WITH AN ONLINE DOCUMENT MANAGEMENT SYSTEM

FIELD OF THE INVENTION

The invention relates to the field of online document management, and in particular, to synchronizing documents between clients and an online document management system.

BACKGROUND

An online document management system allows users to store, access, and manage their documents remotely in the cloud. In addition to basic storage and retrieval services, the document management system may provide additional services to users such as the creation of custom document types, the assignment of metadata for documents, indexing of documents, Optical Character Recognition (OCR) services for documents, version control for documents, etc.

A client computer will typically utilize a replication service to upload files from the client computer to the document management system, and to download files from the document management system to the client computer. This synchronization process may occur periodically (e.g., once per hour). When an upload replication process occurs at the client, documents modified at the client since the last replication along with new documents created at the client are uploaded to the document management system. When a download replication process occurs, documents modified at the document management system along with new documents created at the document management system are downloaded to the client. However, due to the collaborative nature of coordinating multiple clients with access to common documents at the document management system, problems can arise as to which, if any, documents should be archived, either at the client or at the document management system. The result is the accumulation of documents over time that may no longer be needed. With many users collaborating together to modify and/or create documents, it becomes difficult to determine which documents may be old or otherwise out of date. This can promote confusion between users that share access to documents at the document management system.

SUMMARY

Embodiments described herein provide document synchronization capabilities between a client and the document management system. During a synchronization process, a modification time and a size of a document is analyzed to determine whether it should be synchronized between the client and the document management system or archived. Files that have been archived can be considered by users as outdated, stale, or no longer active in the collaboration process. This can reduce the amount of confusion that users experience as common documents in document management system are modified or deleted over time.

In one embodiment, a processor of a computing device is configured, responsive to a synchronization trigger, to identify a mapping between a local folder of the computing device and a remote folder of an online document management system, to identify a local file in the local folder, and to determine if a remote copy of the local file exists in the remote folder. The processor is further configured, when the remote copy does not exist, to determine if the local file was modified after a previous synchronization trigger, and to upload the local file to the remote folder when the local file was modified after the previous synchronization trigger or move the local file to an archive folder on the computing device when the local file was not modified after the previous synchronization trigger. The processor is further configured, when the remote copy does exist in the remote folder, to determine if the local copy was modified after the previous synchronization trigger, to determine if the local file was modified after the remote copy, and to determine if the local file and the remote copy have different file sizes. The processor is further configured to upload the local file to the remote folder when the remote copy was modified after the previous synchronization trigger, the local file was modified after the remote copy, and the local file and the remote copy have different file sizes. The processor is further configured to skip the upload of the local file to the remote folder when the remote copy was not modified after the previous synchronization trigger, the local file was not modified after the remote copy, or the local file and the remote copy do not have different file sizes.

Another embodiment is a method of synchronizing a client with an online document management system. The method comprises identifying, responsive to a synchronization trigger, a mapping between a local folder of a computing device and a remote folder of an online document management system, identifying a local file in the local folder, and determining if a remote copy of the local file exists in the remote folder. The method further comprises determining, when the remote copy does not exist, if the local file was modified after a previous synchronization trigger, and performing the steps of: uploading the local file to the remote folder when the local file was modified after the previous synchronization trigger or moving the local file to an archive folder on the computing device when the local file was not modified after the previous synchronization trigger. The method further comprises performing, when the remote copy does exist, the steps of: determining if the local copy was modified after the previous synchronization trigger, determining if the local file was modified after the remote copy, and determining if the local file and the remote copy have different file sizes. The method further comprises performing, when the remote copy does exist, the steps of uploading the local file to the remote folder when the remote copy was modified after the previous synchronization trigger, the local file was modified after the remote copy, and the local file and the remote copy have different file sizes or skipping the upload of the local file to the remote folder when the remote copy was not modified after the previous synchronization trigger, the local file was not modified after the remote copy, or the local file and the remote copy do not have different file sizes.

Another embodiment is a non-transitory computer readable medium embodying instructions which, when executed by a processor of a computing device, direct the processor to identify, responsive to a synchronization trigger, a mapping between a local folder of the computing device and a remote folder of an online document management system, to identify a local file in the local folder, and to determine if a remote copy of the local file exists in the remote folder. The instructions further direct the processor to determine, when the remote copy does not exist, if the local file was modified after a previous synchronization trigger, and to upload the local file to the remote folder when the local file was modified after the previous synchronization trigger or move the local file to an archive folder on the computing device when the local file was not modified after the previous synchronization trigger. The instructions further direct the processor, when the remote copy does exist, to determine if the local copy was modified after the previous synchronization trigger, to determine if the local file was modified after the remote copy, and to determine if the local file and the remote copy have different file sizes. The instructions further direct the processor to upload the local file to the remote folder when the remote copy was modified after the previous synchronization trigger, the local file was modified after the remote copy, and the local file and the remote copy have different file sizes, or to skip the upload of the local file to the remote folder when the remote copy was not modified after the previous synchronization trigger, the local file was not modified after the remote copy, or the local file and the remote copy do not have different file sizes.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
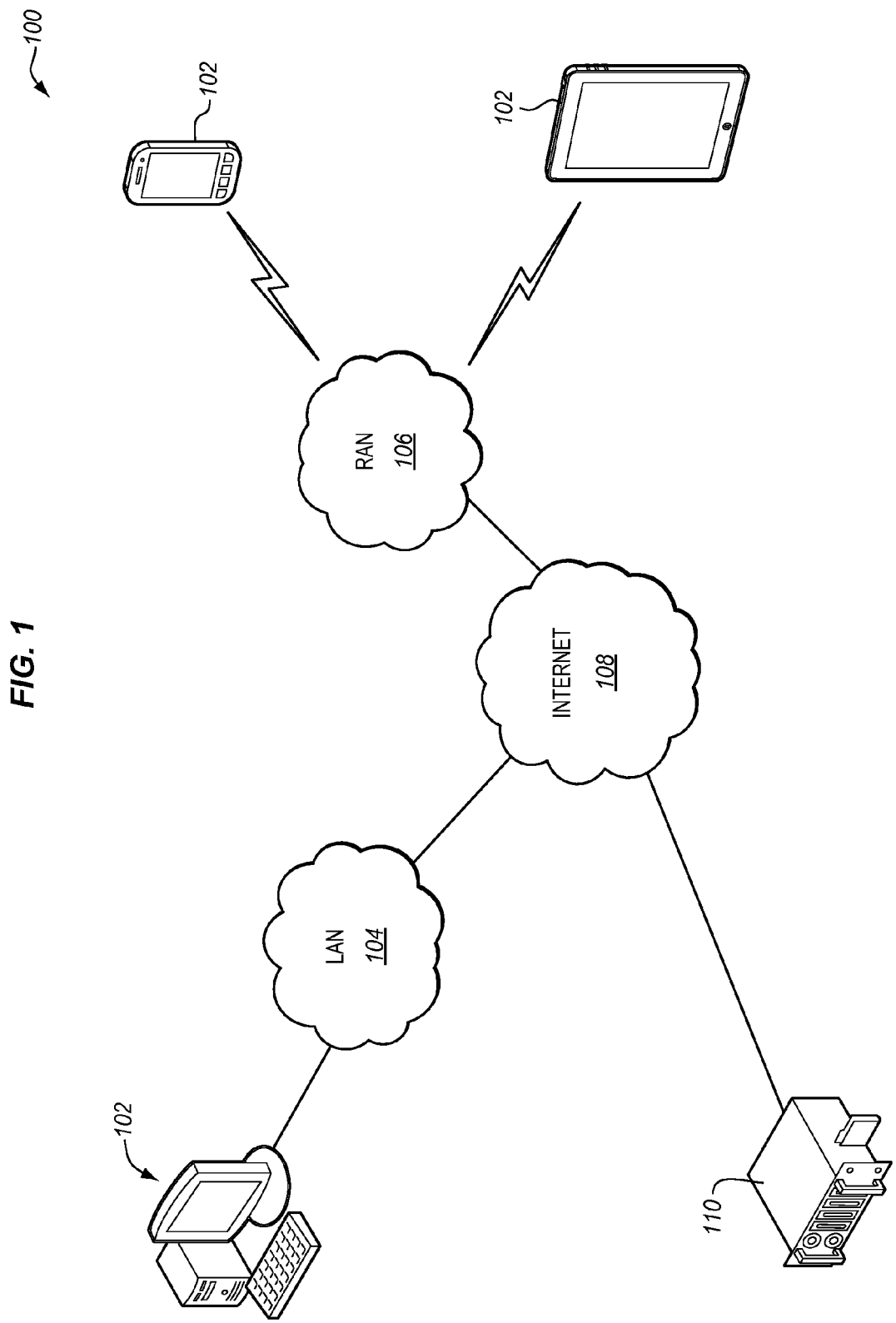
FIG. 1 is a block diagram of an document collaboration system in an exemplary embodiment.

FIG. 1 is a block diagram of a document collaboration system 100 in an exemplary embodiment. In this embodiment, system 100 includes an online document management system 110, which is coupled to the Internet 108 to allow computing devices 102 to participate in a collaborative document environment. In this embodiment, document management system 110 includes any component, system, or device that is able to remotely store and manage documents for computing devices 102. For example, document management system 110 may include one or more file servers that allow computing devices 102 to upload files to document management system 110, download files from document management system 110, check out files, lock files, etc. Document management system 110 may also be referred to as a cloud storage system or an online file management system and/or service.

In this embodiment, three computing devices 102 are illustrated, although the implementation of system 100 may include more or fewer computing devices 102 as an implementation choice. Also, system 100 is not necessarily limited to the particular computing devices 102 illustrated in FIG. 1. In FIG. 1, one of computing devices 102 comprises a computer, which is coupled to Internet 108 utilizing a Local Area Network (LAN) 104. One example of LAN 104 is Ethernet. Also in FIG. 1, another of computing devices 102 comprises a smartphone, which is coupled to Internet 108 using a Radio Access Network (RAN) 106. Some examples of RAN 106 include Wi-Fi networks, cellular networks such as a Global System for Mobile Communications (GSM) network, a Code Division Multiple Access (CDMA) network, etc. Another one of computing devices 102 comprises a tablet computer, which also couples to Internet 108 using RAN 106.

In this embodiment, computing devices 102 comprise any component, system, or device that are able to synchronize locally stored files with document management system 110. For example, a computer may synchronize locally stored files with document management system 110 via LAN 104 and Internet 108 to allow a user of the computer (not shown) to collaborate with other users (e.g., users of the smart phone and/or the tablet). In like manner, the smart phone may synchronize locally stored files with document management system 110 via RAN 106 and Internet 108 to allow a user of the smart phone (not shown) to collaborate with other users (e.g., users of the computer and/or the tablet). The tablet may synchronize locally files with document management system 110 via RAN 106 and Internet 108 to allow a user of the tablet (not shown) to collaborate with other users (e.g., users of the computer and/or the smartphone).

One problem with document collaboration is the potential growth of unwanted files, either remotely at document management system 110 or at computing devices 102. For instance, if a remote file is deleted at document management system 110, then it may be difficult to determine how a local copy of the remote file should be treated at computing devices 102. One possibility is that the local copy is simply ignored in subsequent synchronization processes. However, this may result in a large number of unused files being stored by computing devices 102, which may result in a user being unsure as to whether the local file should be ignored, saved, used as a template for future edits of the file, etc. Another possibility is that the local copy of the remote file is automatically deleted at computing devices 102. However, this may result in lost work in cases where a user has modified the local copy without being aware that the remote file has been deleted from document management system 110 (e.g., by another user).

In the converse case, if a local file is deleted at one of computing devices 102, it may be difficult to determine how a remote copy of the local file should be treated at document management system 110. One possibility is that the remote copy is simply ignored in subsequent synchronization processes. However, this may result in a large number of unused files being stored by document management system 110, which may result in a user being unsure as to whether the remote file should be ignored, saved, used as a template for future edits of the file, etc. Another possibility is that the remote copy of the local file is automatically deleted at document management system 110. However, this may result in lost work in cases where a user has modified the remote copy without being aware that the local file has been deleted from computing devices 102.

In the embodiments described, computing devices 102 are able to perform a synchronization process with document management system 110 utilizing an analysis process to determine if the file (either locally or remotely) should be synchronized or archived. Files that have been archived can be considered by users as outdated, stale, or no longer active in the collaboration process. This can reduce the amount of confusion that users may experience as common files at document management system 110 are modified or deleted over time.

Figure 2:
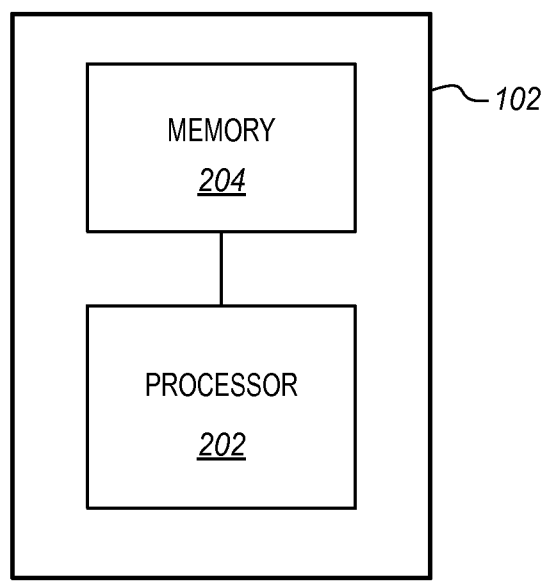
FIG. 2 is a block diagram of the computing device of FIG. 1 in an exemplary embodiment.

FIG. 2 is a block diagram of computing devices 102 of FIG. 1 in an exemplary embodiment. In this embodiment, computing devices 102 include a processor 202 and a memory 204. Processor 202 includes any hardware device that is able to perform functions. Processor 202 may include one or more Central Processing Units (CPU), microprocessors, Digital Signal Processors (DSPs), Application-specific Integrated Circuits (ASICs), etc. Some examples of processors include Intel® Core™ processors, Advanced Risk Machines (ARM®) processors, etc.

Memory 204 includes any hardware device that is able to store data. For instance, memory 204 may store local copies of files downloaded from document management system 110 to allow a user to review and/or modify the local files. Memory 204 may also store files created by a user that have not yet been synchronized with document management system 110. For example, a user may create a new file using a word processing application, and store the file in memory 206 during an edit process for the file. Memory 206 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM.

Figure 3:
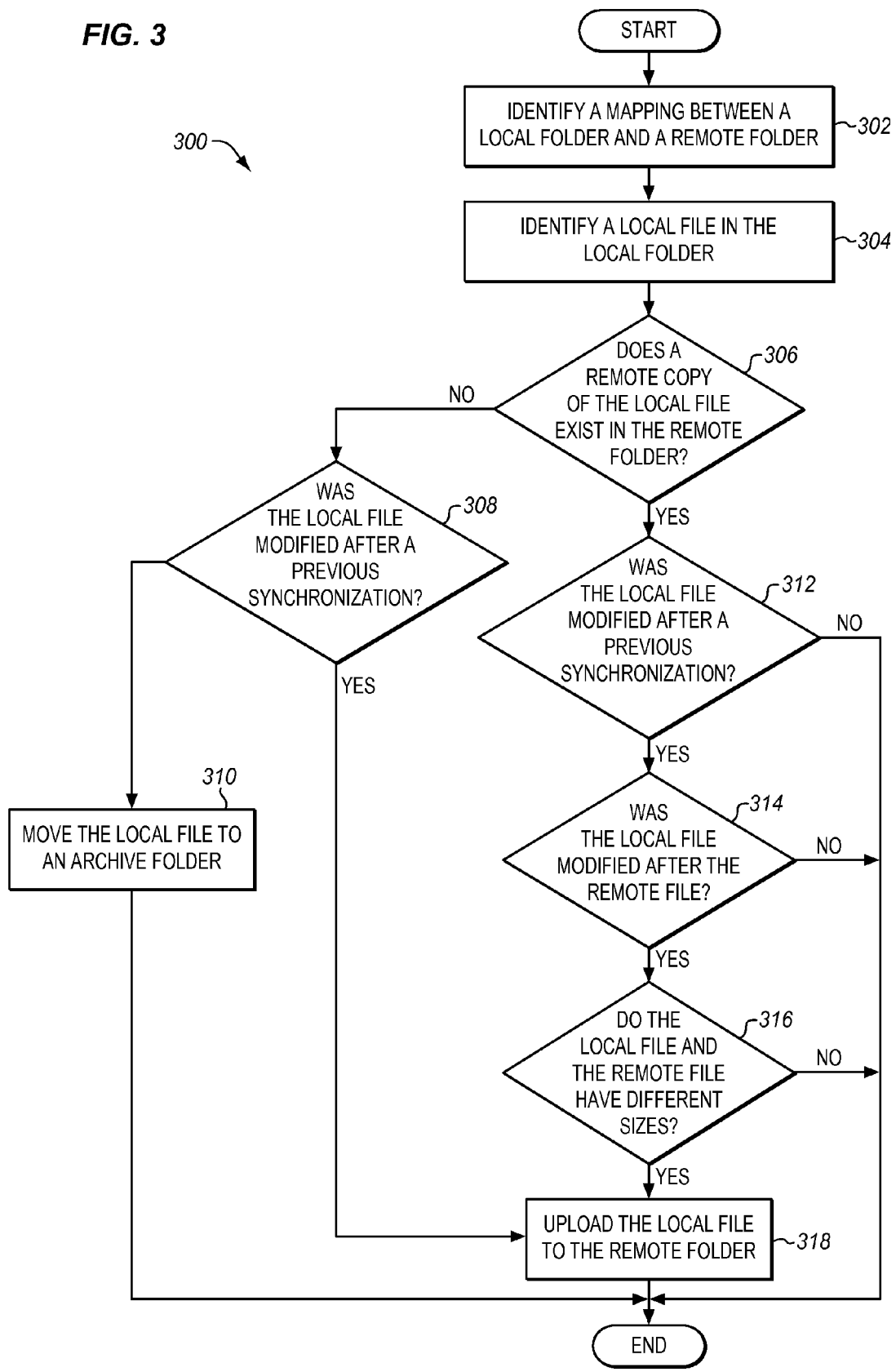
FIG. 3 is a flowchart illustrating a method of synchronizing a computing device with an online document management system utilizing a file upload in an exemplary embodiment.

For this embodiment, assume that computing devices 102 have access to document management system 110, and participate in an online document collaboration environment. FIG. 3 is a flowchart illustrating a method of synchronizing a computing device with an online document management system utilizing a file upload in an exemplary embodiment. The steps of method 300 will be described with reference to FIGS. 1-2, but those skilled in the art will appreciate that method 300 may be performed in other systems. The steps of the flowchart(s) described herein are not all inclusive and may include other steps not shown. The steps described herein may also be performed in an alternative order. Generally, method 300 is performed by computing devices 102 in response to a synchronization trigger, which may occur periodically (e.g., once per hour, at a particular time per day, upon saving a local copy of a file, etc.), or may occur on demand (e.g., manually synchronized by a user).

In response to the synchronization trigger, processor 202 identifies a mapping between a local folder of computing device 102 and a remote folder of document management system 110 (see step 302 of FIG. 3). The mapping may be pre-determined by a user to allow the user to participate in the document collaboration process with other users. For instance, a user may create a local folder at computing device 102 called "finance", and map the local folder to a remote folder called "finance project" stored at document management system 110. This allows the user to synchronize files stored in the local folder with the remote folder.

Processor 202 identifies a local file stored in the local folder (see step 304). A user may drag and drop a file into the local folder, the user may have previously downloaded a file from document management system 110 to the local folder, etc. Processor 202 determines if a remote copy of the local file exists on document management system 110 (step 306). If document management system 110 includes an Application Programming Interface (API) that allows computing device 102 to list the contents of files stored in the remote folder, then an API query may be generated by computing device 102 and transmitted to document management system 110 for a file list or other information that identifies the files or documents stored at the remote folder. If a remote copy does not exist at document management system 110, then processor 202 determines if the local file was modified after a previous synchronization trigger (see step 308).

As discussed previously, the synchronization trigger or synchronization process may occur periodically, based on a schedule, on demand from a user, etc. Processor 202 may compare the timestamp of the local file with a time when a previous synchronization trigger occurred and determine if the local file has changed since the previous synchronization trigger. This may occur if the user made changes to the local file after the previous synchronization trigger. If the local file has changed, then processor 202 uploads the local file to the remote folder at document management system 110 (see step 318). However, if the local file had not changed since the previous synchronization trigger, then processor 202 moves the local file to an archive folder (see step 310). Moving the local file to an archive folder removes the local file from the local folder yet retains a copy of the local file for a user in an archive folder. In this case, the file did not exist on document management system 110, and the local file had not changed since the previous synchronization trigger. This may occur when the remote version of the local file stored at document management system 110 is deleted (e.g., deleted by another user). In a collaboration environment, a file may be deleted at document management system 110 if it is no longer needed. Rather than simply deleting the local file at computing device 102, which may still be useful to a user, the local file is archived at computing device 102. In like manner, rather than simply ignoring the local file at computing device 102, which may unnecessarily render the local folder more confusing for a user, the local file is archived at the computing device 102.

Returning again to step 306, if a remote copy of the local file does exist in the remote folder, then processor 202 will skip an upload of the local file to the remote folder if the local file was not modified after the previous synchronization trigger (see step 312). This may occur when a file is not being actively edited by a user of computing device 102. In this case, it would be unnecessary to upload the local file to document management system 110 because no changes have been made to the local file. If however the local file had changed since the previous synchronization trigger, then processor 202 determines if the local file was modified after the remote file (see step 314). To do so, processor 202 may generate an API request for document management system 110 regarding the remote file. The API request allows document management system 110 to return timestamp information about the remote file that can be used by processor 202 to determine if the local file was modified after the remote file. If the local file was not modified after the remote file, then processor 202 will skip an upload of the local file to the remote folder.

If the local file was modified after the remote file, then processor 202 determines if the local file and the remote file have different sizes (see step 316). In some cases, a file is opened and no changes are made. When the file is subsequently closed, a timestamp for the file may be modified. By comparing a size of the local file with a size of the remote file, processor 202 is able to detect this case. To do so, processor 202 may generate an API request for document management system 110 regarding the remote file. The API request allows document management system 110 to return size information about the remote file that can be used by processor 202 to determine if the local file is a different size than the remote file. If the sizes are the same, the processor 202 will skip an upload of the local file. If the sizes are different, then processor 202 will upload the local file to the remote folder at document management system 110 (see step 318). This makes the local file available to other users in the collaboration environment. When uploading the file, processor 202 may overwrite the remote file stored in the remote folder with the local file, or create a new version of the remote file with the local file. In response to uploading the file, processor 202 may return to step 304 and identify additional files (if any) in the local folder of computing device 102, and re-start a synchronization process for the additional files with document management system 110.

Figure 4:
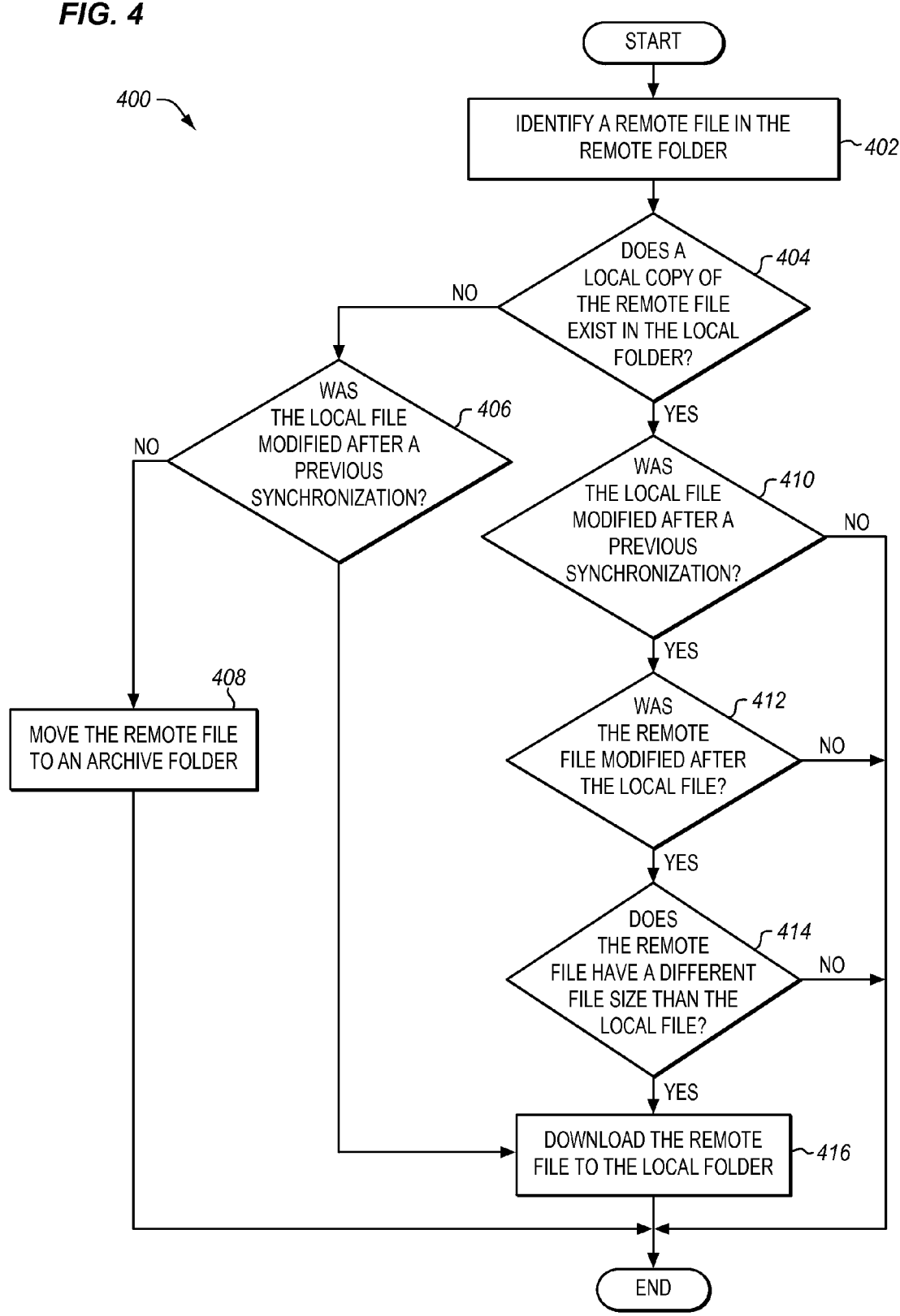
FIG. 4 is a flowchart illustrating a method of synchronizing a computing device with an online document management system utilizing a file download in an exemplary embodiment.

FIG. 4 is a flowchart illustrating a method of synchronizing a computing device with an online document management system utilizing a file download in an exemplary embodiment. The steps of method 400 will be described with reference to FIGS. 1-2, but those skilled in the art will appreciate that method 400 may be performed in other systems. Method 400 may be performed by computing devices 102 in some embodiments in addition to method 300. For instance, after performing an upload of files from the local folder to the remote folder, processor 202 may then perform method 400 to determine if any files in the remote folder are to be downloaded from document management system 110 to computing devices 102.

Processor 202 identifies a remote file stored in the remote folder (see step 402 of FIG. 4). Processor 202 determines if a local copy of the remote file exists on computing device 102 (step 404). An API query may be generated by processor 202 and transmitted to document management system 110 for a file list or other information that identifies the files or documents stored at the remote folder. This information may be compared to files in the local folder. If a local copy does not exist at computing device 102, then processor 202 determines if the remote file was modified after a previous synchronization trigger (see step 406).

Processor 202 may compare the timestamp of the remote file with a time when a previous synchronization trigger occurred and determine if the remote file has changed since the previous synchronization trigger. This may occur if a user had made changes to the remote file after the previous synchronization trigger. If the remote file has changed, then processor 202 downloads the remote file to the local folder at computing device 102 (see step 416). However, if the remote file had not changed since the previous synchronization trigger, then processor 202 moves the remote file to an archive folder on document management system 110 (see step 408). Moving the remote file to an archive folder removes the remote file from the remote folder yet retains a copy of the remote file for users in an archive folder. In this case, the file did not exist on computing device 102 and the remote file had not changed since the previous synchronization trigger. This may occur when the local version of the remote file stored at computing device 102 is deleted (e.g., deleted by the user of computing device 102). In a collaboration environment, a file may be deleted at computing device 102 if it is no longer needed. Rather than simply deleting the remote file at document management system 110, which may still be useful to other users, the remote file is archived at document management system 110. In like manner, rather than simply ignoring the remote file at document management system 110, which may unnecessarily render the remote folder more confusing for users, the remote file is archived at document management system 110.

Returning again to step 404, if a local copy of the remote file does exist in the local folder, then processor 202 will skip a download of the remote file to the local folder if the remote file was not modified after the previous synchronization trigger (see step 410). This may occur when a file is not being actively edited by other users. In this case, it would be unnecessary to download the remote file to computing device 102 because no changes have been made to the remote file. If however the remote file had changed since the previous synchronization trigger, then processor 202 determines if the remote file was modified after the local file (see step 412). To do so, processor 202 may generate an API request for document management system 110 regarding the remote file. The API request allows document management system 110 to return timestamp information about the remote file that can be used by processor 202 to determine if the remote file was modified after the local file. If the remote file was not modified after the local file, then processor 202 will skip a download of the remote file to the local folder.

However, if the remote file was modified after the local file, then processor 202 determines if the remote file and the local file have different sizes (see step 414). In some cases, a file is opened and no changes are made. When the file is subsequently closed, a timestamp for the file may be modified. By comparing a size of the remote file with a size of the local file, processor 202 is able to detect this case. To do so, processor 202 may generate an API request for document management system 110 regarding the remote file. The API request allows document management system 110 to return size information about the remote file that can be used by processor 202 to determine if the local file is a different size than the remote file. If the sizes are the same, the processor 202 will skip a download of the remote file. If the sizes are different, then processor 202 will download the remote file to the local folder (see step 416). This makes the remote file available to a user of computing device 102 in the collaboration environment. When downloading the file, processor 202 may overwrite the local file stored in the local folder with the remote file, or create a new version of the local file with the remote file. In response to downloading the file, processor 202 may return to step 402 and identify additional files (if any) in the remote folder of document management system 110, and re-start a synchronization process for the additional files with computing device 102.

Example

Figure 5:
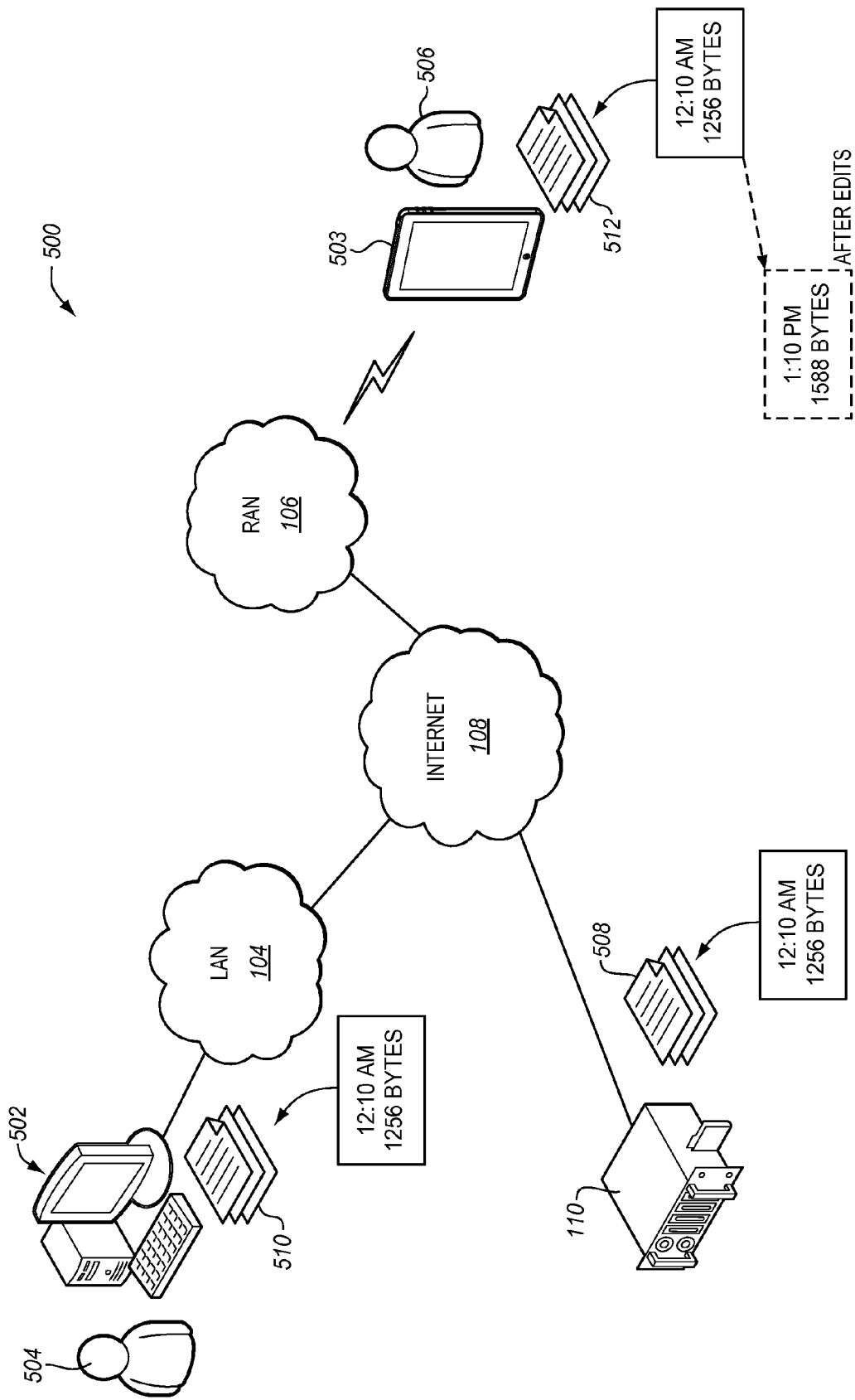
FIG. 5 is a block diagram of another document collaboration system in an exemplary embodiment.

The following example will be discussed with respect to online collaboration system 500 of FIG. 5. The example is not intended to define a preferred embodiment or limit the scope of the claims but rather, is intended to provide one possible implementation of synchronizing documents between a computing device and an online document management system.

Assume for this embodiment that user 504 approaches a computer 502 and launches a local synchronization agent. The synchronization agent determines that a document 508 stored by document management system 110 is not locally stored at computer 502, and the agent downloads document 508 to computer 502. At this point, a local document 510 stored at computer 502 is the same as the remote document 508 stored at document management system 110. This is illustrated in FIG. 5 by document 508 and document 510 sharing the same timestamp (12:10 AM) and file size (1256 bytes).

Also assume for this embodiment that user 506 approaches a tablet 503 and launches a synchronization agent. The synchronization agent determines that a document 508 stored by document management system 110 is not locally stored at tablet 503, and the agent downloads document 508 to tablet 503. At this point, a local document 512 stored at tablet 503 is the same as the remote document 508 stored at document management system 110. This is illustrated in FIG. 5 by document 508 and document 512 sharing the same timestamp (12:10 AM) and file size (1256 bytes).

User 506 begins working on document 512, which is stored locally at tablet 503, and after some time, saves document 512. At some point, a synchronization process is initiated at tablet 503. For example, user 506 may have configured the synchronization agent to synchronize tablet 503 with document management system 110 every 4 hours. The synchronization agent uploads document 512 from tablet 503 to document management system 110 and overwrites document 508 with document 512.

Since user 504 has not modified document 510 at computer 502, a synchronization agent executing on computer 502 does not upload document 510 to document management system 110. However, the synchronization agent executing on computer 502 determines that document 510 is out of date, and downloads document 512 from document management system 110 to computer 502 and overwrites document 510 at computer 502. The next time user 504 works at computer 502, user 504 has access to document 512 that was modified at tablet 503.

If at some point user 504 deletes the local version of downloaded document 512, the synchronization agent executing on computer 502 detects this and instructs document management system 110 to move the remote file to an archive folder. In this case, the next time tablet 503 synchronizes with document management system 110, the synchronization agent executing on tablet 503 detects that document management system 110 no longer stores the previously uploaded document 512 and will archive document 512 stored on tablet 503. The next time user 506 works at tablet 503, user 506 will be able to determine that document 512 has been archived by another user (e.g., user 504) and that work on document 512 should cease.

Figure 6:
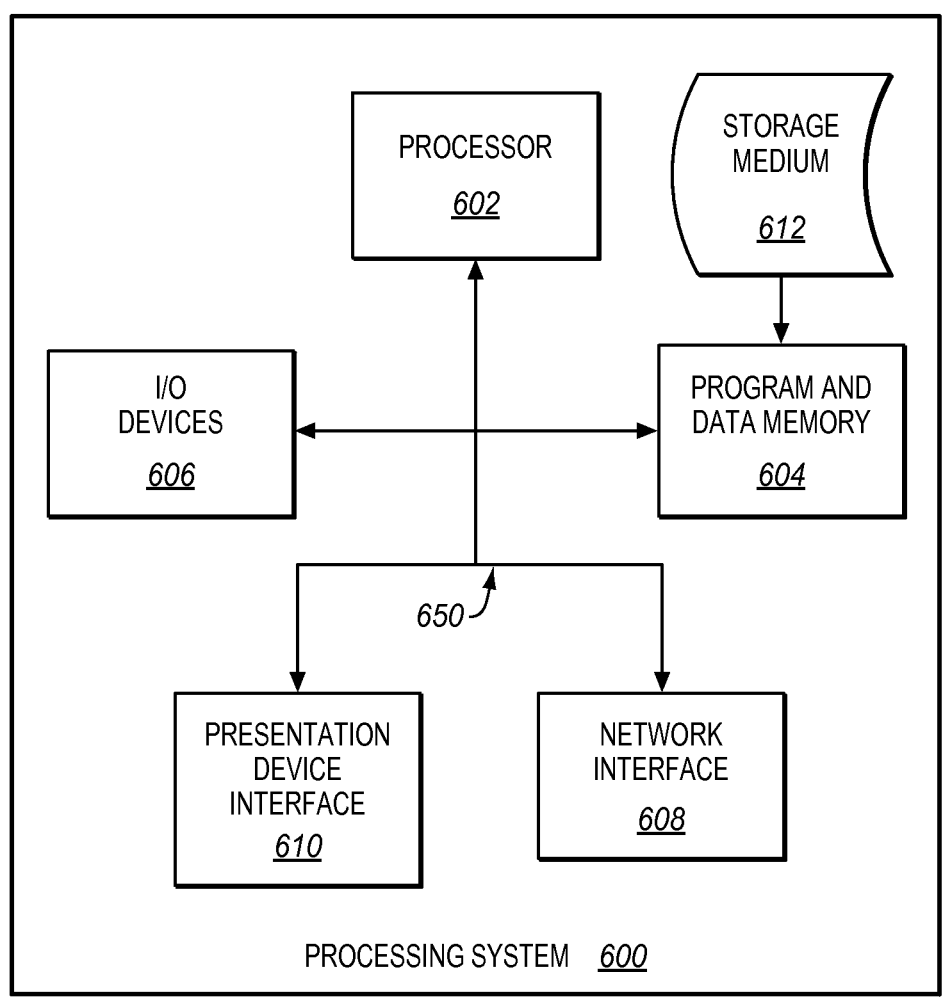
FIG. 6 is a block diagram of a processing system configured to execute programmed instructions to perform desired functions in an exemplary embodiment.

Embodiments disclosed herein can take the form of software, hardware, firmware, or various combinations thereof. FIG. 6 is a block diagram of a processing system configured to execute programmed instructions to perform desired functions in an exemplary embodiment.

Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be integrated with the system to interface to one or more presentation devices, such as printing systems and displays for presentation of presentation data generated by processor 602.

Although specific embodiments were described herein, the scope of the invention is not limited to those specific embodiments. The scope of the invention is defined by the following claims and any equivalents thereof.

I claim:
1. An apparatus comprising:
a processor of a computing device that is configured, responsive to a synchronization trigger, to identify a mapping between a local folder of the computing device and a remote folder of an online document management system, to identify a local file in the local folder, and to determine if a remote copy of the local file exists in the remote folder;
the processor is configured, when the remote copy does not exist, to determine if the local file was modified after a previous synchronization trigger, and to:
upload the local file to the remote folder when the local file was modified after the previous synchronization trigger; and
move the local file to an archive folder on the computing device when the local file was not modified after the previous synchronization trigger;
the processor is configured, when the remote copy does exist in the remote folder, to determine if the remote copy was modified after the previous synchronization trigger, to determine if the local file was modified after the remote copy, and to determine if the local file and the remote copy have different file sizes, and to:
upload the local file to the remote folder when the remote copy was modified after the previous synchronization trigger, the local file was modified after the remote copy, and the local file and the remote copy have different file sizes; and skip the upload of the local file to the remote folder when the remote copy was not modified after the previous synchronization trigger, or the local file was not modified after the remote copy, or the local file and the remote copy do not have different file sizes.

2. The apparatus of claim 1 wherein:

the processor is configured to identify a remote file in the remote folder, and to determine if a local copy of the remote file exists in the local folder;

the processor is configured, when the local copy does not exist, to determine if the remote file was modified after a previous synchronization trigger, and to:

download the remote file to the local folder when the remote file was modified after the previous synchronization trigger; or move the remote file to an archive folder of the online document management system when the remote file was not modified after the previous synchronization trigger.

3. The apparatus of claim 2 wherein:

the processor is configured, when the local copy does exist, to determine if the remote file was modified after the previous synchronization trigger, to determine if the remote file was modified after the local copy, and to determine if the remote file and the local copy have different file sizes, and to:

download the remote file to the local folder when the remote file was modified after the previous synchronization trigger, the remote file was modified after the local copy, and the remote file and the local copy have different file sizes; or skip the download of the remote file to the local folder when the remote file was not modified after the previous synchronization trigger, the remote file was not modified after the local copy, or the remote file and the local copy do not have different file sizes.

4. The apparatus of claim 1 wherein the processor, to determine if a remote copy of the local file exists in the remote folder, is configured to:

transmit an Application Programming Interface (API) request to the online document management system to identify files stored in the remote folder, and to compare a response to the API request with a name of the local file to determine if the remote copy of the local file exists in the remote folder.

5. The apparatus of claim 1 wherein the processor, to determine if the local file was modified after the remote copy, is configured to:

transmit an Application Programming Interface (API) request to the online document management system to identify a last modified timestamp for the remote copy, and to compare a response to the API request with a last modified timestamp for the local file to determine if the local file was modified after the remote copy.

6. The apparatus of claim 1 wherein the processor, to determine if the local file and the remote copy have different file sizes, is configured to:

transmit an Application Programming Interface (API) request to the online document management system to identify a file size of the remote copy, and to compare a response to the API request with a file size of the local file to determine if the local file and the remote copy have different file sizes.

7. A method comprising:

identifying, responsive to a synchronization trigger, a mapping between a local folder of a computing device and a remote folder of an online document management system;

identifying a local file in the local folder;

determining if a remote copy of the local file exists in the remote folder;

determining, when the remote copy does not exist, if the local file was modified after a previous synchronization trigger, and performing the steps of:

uploading the local file to the remote folder when the local file was modified after the previous synchronization trigger; and moving the local file to an archive folder on the computing device when the local file was not modified after the previous synchronization trigger;

performing, when the remote copy does exist, the steps of:

determining if the remote copy was modified after the previous synchronization trigger;

determining if the local file was modified after the remote copy;

determining if the local file and the remote copy have different file sizes; and uploading the local file to the remote folder when the remote copy was modified after the previous synchronization trigger, the local file was modified after the remote copy, and the local file and the remote copy have different file sizes; and skipping the upload of the local file to the remote folder when the remote copy was not modified after the previous synchronization trigger, the local file was not modified after the remote copy, or the local file and the remote copy do not have different file sizes.

8. The method of claim 7 further comprising:

identifying a remote file in the remote folder;

determining if a local copy of the remote file exists in the local folder;

determining, when the local copy does not exist, if the remote file was modified after a previous synchronization trigger, and performing the steps of:

downloading the remote file to the local folder when the remote file was modified after the previous synchronization trigger; or moving the remote file to an archive folder of the online document management system when the remote file was not modified after the previous synchronization trigger.

9. The method of claim 8 further comprising:

performing, when the local copy does exist, the steps of:

determining if the remote file was modified after the previous synchronization trigger;

determining if the remote file was modified after the local copy;

determining if the remote file and the local copy have different file sizes; and downloading the remote file to the local folder when the remote file was modified after the previous synchronization trigger, the remote file was modified after the local copy, and the remote file and the local copy have different file sizes; or skipping the download of the remote file to the local folder when the remote file was not modified after the previous synchronization trigger, the remote file was not modified after the local copy, or the remote file and the local copy do not have different file sizes.

10. The method of claim 7 wherein determining if a remote copy of the local file exists in the remote folder comprises:
    transmitting an Application Programming Interface (API) request to the online document management system to identify files stored in the remote folder; and
    comparing a response to the API request with a name of the local file to determine if the remote copy of the local file exists in the remote folder.

11. The method of claim 7 wherein determining if the local file was modified after the remote copy comprises:
    transmitting an Application Programming Interface (API) request to the online document management system to identify a last modified timestamp for the remote copy; and
    comparing a response to the API request with a last modified timestamp for the local file to determine if the local file was modified after the remote copy.

12. The method of claim 7 wherein determining if the local file and the remote copy have different file sizes comprises:
    transmitting an Application Programming Interface (API) request to the online document management system to identify a file size of the remote copy; and
    comparing a response to the API request with a file size of the local file to determine if the local file and the remote copy have different file sizes.

13. A non-transitory computer readable medium embodying instructions which, when executed by a processor of a computing device, direct the processor to:
    identify, responsive to a synchronization trigger, a mapping between a local folder of the computing device and a remote folder of an online document management system;
    identify a local file in the local folder;
    determine if a remote copy of the local file exists in the remote folder;
    determine, when the remote copy does not exist, if the local file was modified after a previous synchronization trigger, and to:
    upload the local file to the remote folder when the local file was modified after the previous synchronization trigger; and
    move the local file to an archive folder on the computing device when the local file was not modified after the previous synchronization trigger;
    perform, when the remote copy does exist, the following:
    determine if the remote copy was modified after the previous synchronization trigger;
    determine if the local file was modified after the remote copy;
    determine if the local file and the remote copy have different file sizes; and
    upload the local file to the remote folder when the remote copy was modified after the previous synchronization trigger, the local file was modified after the remote copy, and the local file and the remote copy have different file sizes; and
    skip the upload of the local file to the remote folder when the remote copy was not modified after the previous synchronization trigger, the local file was not modified after the remote copy, or the local file and the remote copy do not have different file sizes.

14. The non-transitory computer readable medium of claim 13, wherein the instructions further direct the processor to:
    identify a remote file in the remote folder;
    determine if a local copy of the remote file exists in the local folder;
    determine, when the local copy does not exist, if the remote file was modified after a previous synchronization trigger, and to:
    download the remote file to the local folder when the remote file was modified after the previous synchronization trigger; or
    move the remote file to an archive folder of the online document management system when the remote file was not modified after the previous synchronization trigger.

15. The non-transitory computer readable medium of claim 14, wherein the instructions further direct the processor to:
    perform, when the local copy does exist, the following:
    determine if the remote file was modified after the previous synchronization trigger;
    determine if the remote file was modified after the local copy;
    determine if the remote file and the local copy have different file sizes; and
    download the remote file to the local folder when the remote file was modified after the previous synchronization trigger, the remote file was modified after the local copy, and the remote file and the local copy have different file sizes; or
    skip the download of the remote file to the local folder when the remote file was not modified after the previous synchronization trigger, the remote file was not modified after the local copy, or the remote file and the local copy do not have different file sizes.

16. The non-transitory computer readable medium of claim 13, wherein the instructions to determine if a remote copy of the local file exists in the remote folder comprise instructions to:
    transmit an Application Programming Interface (API) request to the online document management system to identify files stored in the remote folder; and
    compare a response to the API request with a name of the local file to determine if the remote copy of the local file exists in the remote folder.

17. The non-transitory computer readable medium of claim 13, wherein the instructions to determine if the local file was modified after the remote copy comprise instructions to:
    transmit an Application Programming Interface (API) request to the online document management system to identify a last modified timestamp for the remote copy; and
    compare a response to the API request with a last modified timestamp for the local file to determine if the local file was modified after the remote copy.

18. The non-transitory computer readable medium of claim 13, wherein the instructions to determining if the local file and the remote copy have different file sizes comprise instructions to:
    transmit an Application Programming Interface (API) request to the online document management system to identify a file size of the remote copy; and
    compare a response to the API request with a file size of the local file to determine if the local file and the remote copy have different file sizes.

* * * * *